US012625718B2

(12) United States Patent
Lin

(10) Patent No.: US 12,625,718 B2
(45) Date of Patent: May 12, 2026

(54) METHOD FOR CREATING NETWORK SERVICE NS AND RELATED APPARATUS

(71) Applicant: HUAWEI TECHNOLOGIES CO., LTD., Guangdong (CN)

(72) Inventor: Yiwen Lin, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 453 days.

(21) Appl. No.: 18/240,433

(22) Filed: Aug. 31, 2023

(65) Prior Publication Data

US 2023/0409371 A1     Dec. 21, 2023

Related U.S. Application Data

(63) Continuation of application No. PCT/CN2021/133873, filed on Nov. 29, 2021.

(30) Foreign Application Priority Data

Mar. 4, 2021    (CN) .......................... 202110239645.0

(51) Int. Cl.
*G06F 9/455* (2018.01)
*H04L 67/50* (2022.01)
(52) U.S. Cl.
CPC .......... *G06F 9/45558* (2013.01); *H04L 67/50* (2022.05); *G06F 2009/45562* (2013.01); *G06F 2009/45595* (2013.01)
(58) Field of Classification Search
None
See application file for complete search history.

(56) References Cited

U.S. PATENT DOCUMENTS 10,177,982 B2 *   1/2019   Yu ........................ H04L 12/4641
10,432,460 B2 *  10/2019   Li .......................... G06F 9/5077
(Continued)

FOREIGN PATENT DOCUMENTS

CN          112187545 A        1/2021

OTHER PUBLICATIONS

Nakimuli et al. "Reducing Service Creation Time Leveraging on Network Function Virtualization", 2020 IEEE, 18 pages.*
(Continued)

*Primary Examiner* — Van H Nguyen
(74) *Attorney, Agent, or Firm* — WOMBLE BOND DICKINSON (US) LLP

(57) ABSTRACT

Embodiments of this application disclose a method for creating a network service NS and a related apparatus. The method includes: A management device sends a network service descriptor NSD query request to a network functions virtualization orchestrator NFVO, and then receives information about an NSD from the NFVO. Because the information about the NSD includes information about a network service deployment flavour, the management device may determine an instantiation parameter based on the information about the network service deployment flavour, to request the NFVO to create an NS instance, and a staff does not need to input the instantiation parameter by using the NFVO. In this way, operation complexity of deploying the NS instance by using the management device is reduced, and an error caused by manually inputting the instantiation parameter is avoided.

21 Claims, 4 Drawing Sheets

(56) References Cited

U.S. PATENT DOCUMENTS

| | | | | |
|---|---|---|---|---|
| 10,523,529 | B2 * | 12/2019 | Yu | H04L 41/0897 |
| 10,700,947 | B2 * | 6/2020 | Xu | H04L 41/5041 |
| 10,924,943 | B2 * | 2/2021 | Chou | H04L 41/04 |
| 11,102,086 | B2 * | 8/2021 | Chou | H04L 41/5041 |
| 11,108,653 | B2 * | 8/2021 | Xia | G06F 9/45558 |
| 11,296,945 | B2 * | 4/2022 | Xu | H04L 41/0895 |
| 11,296,957 | B2 * | 4/2022 | Xu | H04L 41/0806 |
| 11,301,284 | B2 * | 4/2022 | Li | G06F 9/45558 |
| 11,303,526 | B2 * | 4/2022 | Fang | H04W 28/16 |
| 11,405,798 | B2 * | 8/2022 | Yao | H04W 16/18 |
| 2018/0324261 | A1 | 11/2018 | Yi et al. | |
| 2020/0110627 | A1 * | 4/2020 | Chou | H04W 24/02 |

OTHER PUBLICATIONS

Beckner et al. "Nework Service Creation—a Key to the Future",
1990 IEEE, 4 pages.*
"ETSI GS NFV-IFA 014 V3.2.1 (Apr. 2019)",Network Functions
Virtualisation (NFV) Release 3;Management and
Orchestration;Network Service Templates Specification,total 44 pages.

* cited by examiner

500

600

METHOD FOR CREATING NETWORK SERVICE NS AND RELATED APPARATUS

CROSS-REFERENCE TO RELATED APPLICATIONS

This application is a continuation of International Patent Application No. PCT/CN2021/133873 filed on Nov. 29, 2021, which claims priority to Chinese Patent Application No. 202110239645.0, filed on Mar. 4, 2021. The disclosures of the aforementioned applications are hereby incorporated by reference in their entireties.

TECHNICAL FIELD

This application relates to the field of network function virtualization, and in particular, to a method for creating a network service (NS) and a related apparatus.

BACKGROUND

In a network function virtualization (NFV) technology, a virtualization technology is used to virtualize a function of a dedicated device in a conventional network into an independent application, and flexibly deploy the application on a unified infrastructure platform constructed based on other standard devices such as computing hardware, storage hardware, and network hardware. A function implemented by using the NFV technology is referred to as a network service (NS).

In the conventional technology, to deploy an NS in an NFV system, an operations support system (OSS) and/or a business support system (BSS) need/needs to upload information about a network service descriptor (NSD) to a network functions virtualization orchestrator (NFVO), to enable the NFVO to deploy the NS based on the information about the NSD.

However, in the conventional technology, when the NS is deployed through operating on the OSS/BSS, a staff needs to input an instantiation parameter by using the NFVO. Consequently, an operation of deploying the NS by using the OSS/BSS is complex, and an error is easily caused by manually inputting the instantiation parameter.

SUMMARY

Embodiments of this application provide a method for creating a network service NS and a related apparatus, to query information about an NSD from an NFVO, and request, by using information about a network service deployment flavour in the information about the NSD, the NFVO to create an NS instance.

According to a first aspect, a method for creating a network service NS is provided, and the method may be applied to a management device. In the method, the management device sends a network service descriptor NSD query request to a network functions virtualization orchestrator NFVO, and then receives information about an NSD from the NFVO. Because the information about the NSD includes information about a network service deployment flavour, the management device may determine an instantiation parameter based on the information about the network service deployment flavour, to request the NFVO to create an NS instance, and a staff does not need to input the instantiation parameter by using the NFVO. In this way, operation complexity of deploying the NS instance by using the management device is reduced, and an error caused by manually inputting the instantiation parameter is avoided.

In an embodiment, the management device receives an NSD information list sent by the NFVO, and the NSD information list includes information about at least one NSD. In this way, the management device may select the information about the NSD from information about at least one NSD in the NSD information list based on an actual requirement. For example, if an NS needed by an OSS/BSS is a next generation mobile core network (EPC) service, the OSS/BSS may search the NSD information list for information about an NSD named related to the EPC service (for example, EPC or the next generation mobile core network service), and then select the information about the NSD.

In an embodiment, the information about the NSD includes information about at least one network service deployment flavour. In this way, the management device may select the information about the network service deployment flavour from the information about the at least one network service deployment flavour based on a requirement of a to-be-deployed NS instance. For example, if a main function of the to-be-deployed NS instance is to store data, and information about a network service deployment flavour may implement the data storage function, the OSS/BSS may select the information about the network service deployment flavour.

In an embodiment, the information about the network service deployment flavour includes an identifier of the network service deployment flavour NSDF, an identifier of at least one virtualized network function descriptor VNFD, and/or an identifier of at least one physical network function descriptor PNFD. In this way, the management device may obtain, based on the identifier of the NSDF, the identifier of the at least one VNFD, and/or the identifier of the at least one PNFD, the instantiation parameter for deploying the NS instance.

In an embodiment, the identifier of the at least one VNFD includes an identifier of a first VNFD. In this way, the management device may obtain information about a first virtualized network function VNF instance based on the identifier of the first VNFD. An NS instantiation request includes the identifier of the NSDF, the identifier of the first VNFD, and the information about the first VNF instance. In this way, when deploying the NS instance, the NFVO may determine the NSDF based on the identifier of the NSDF, and determine a reusable first VNF instance based on the identifier of the first VNFD and the information about the first VNF instance.

In an embodiment, the management device sends a VNF query request to the NFVO. The VNF query request carries the identifier of the first VNFD, and is used to request information about a VNF instance from the NFVO, to enable the NFVO to determine information about a reusable first VNF instance based on the identifier of the first VNFD. After the management device receives an information list of the first VNF instance from the NFVO, and the information list of the first VNF instance includes information about at least one VNF instance obtained by instantiating the first VNFD, in this way, the information about the reusable first VNF instance in the information list of the first VNF instance is obtained.

It should be noted that, the "reusable first VNF instance" indicates that the first VNF instance has been instantiated, and may be selected and reused by a newly created NS instance. In an embodiment, "reuse" indicates using an existing VNF instance as a VNF instance of a to-be-created NS instance. In other words, the to-be-created NS instance reuses the first VNF instance, indicating that the NS instance includes the first VNF instance.

In an embodiment, the information about the first VNF instance may further include a rule, an available resource, a service capability, a location, and/or the like of the first VNF instance. The OSS/BSS may also determine, based on one or more of the information, whether to reuse the first VNF instance in the NS instance.

In an embodiment, the identifier of the at least one VNFD includes an identifier of a second VNFD, and the management device obtains information about a virtual private cloud VPC, to deploy, by using the VPC, a second VNF instance created based on the second VNFD. In this way, the NS instantiation request may further include the identifier of the second VNFD and the information about the VPC.

In an embodiment, the management device sends a VPC query request to the NFVO. The VPC query request is used to request the information about the VPC from the NFVO. The management device receives a VPC list from the NFVO. The VPC list includes information about at least one VPC. The management device may determine the information about the VPC from the VPC list based on an actual requirement. A name in the information about the VPC is usually named based on a location of the VPC, for example, Dongxiao Street, Luohu District, Shenzhen. In an embodiment, the name in the information about the VPC may also be named by using a service of the VPC, for example, an IMS. The foregoing example is continuously used. The OSS/BSS may send the VPC query request to request that information about each available VPC should be included in a VPC information list sent by the NFVO to the OSS/BSS. In an embodiment, the OSS/BSS may send the VPC query request to request that information about an available VPC that meets a resource or location should be carried in the VPC information list sent by the NFVO to the OSS/BSS.

In an embodiment, the management device obtains information about a PNF based on the identifier of the at least one PNFD. In this way, the NS instantiation request may further include the identifier of the PNFD and the information that is about the PNF and that is indicated by the identifier of the PNFD, to enable the NFVO to deploy the NS instance based on the identifier of the PNFD and the information about the PNF. It should be noted that, a current NFV system may provide a VNF service and a PNF service. The PNF is a node of physical hardware, and provides a service of a dedicated device. In an embodiment of the application, the NFV system may provide both the VNF service and/or the PNF service for selection by the OSS/BSS.

In an embodiment, after selecting the information about the NSD, if the information about the NSD indicates that a deployed NS instance includes a VNF instance, the management device needs to select to reuse a VNF instance or create a VNF instance. If the management device selects to reuse a VNF instance, the management device may perform obtaining information about the reusable VNF instance from the NFVO and a subsequent operation. If the management device selects to create a VNF instance, the management device may perform determining an available VPC from the NFVO and a subsequent operation. If the information about the NSD indicates that the deployed NS instance includes a PNF instance, the management device needs to perform selecting a reused PNF and a subsequent operation. If the information about the NSD indicates that the deployed NS instance includes the VNF instance and the PNF instance, the management device needs to perform selecting to reuse a VNF instance or creating a VNF instance and a subsequent operation, and perform determining an available VPC from the NFVO and a subsequent operation.

In an embodiment, the management device sends a PNF query request to an equipment management system EM. The PNF query request carries the identifier of the PNFD, to request, from the NFVO, the information about the PNF associated with the PNFD. In this way, the EM sends a PNF list to the management device, and the PNF list includes information about at least one PNF associated with the identifier of the PNFD. In this way, the management device may determine the information about the PNF from the PNF list based on an actual requirement, for example, based on a function that needs to be implemented, a city in which the management device is located, or the like. In this way, the OSS/BSS may determine, based on a name of a PNF, whether to select the PNF. In an embodiment, the OSS/BSS may also determine, based on a vendor, a version, and a type in the information about the PNF, whether to select the PNF.

In an embodiment, the management device is an operations support system and a business support system (OSS/BSS) or a core network-network slice subnet management function (CN NSSMF). In this way, the management device may provide an NS service for different types of users (an OSS/BSS user or a CN NSSMF user).

According to a second aspect, a method for creating a network service NS is provided, and the method may be applied to a network function virtualization orchestrator (NFV orchestrator, NFVO) device. In the method, the NFVO receives a network service descriptor NSD query request sent by a management device. The NSD query request is used to request information about an NSD from the NFVO. Then the NFVO sends the information about the NSD to the management device. The information about the NSD includes information about a network service deployment flavour, and the information about the network service deployment flavour indicates a deployment flavour of a user for a network service. Then the NFVO receives an NS instantiation request sent by the management device based on the information about the network service deployment flavour, and creates an NS instance related to the NSD based on the NS instantiation request. Because the information about the NSD includes the information about the network service deployment flavour, the management device may determine an instantiation parameter based on the information about the network service deployment flavour, to request the NFVO to create the NS instance, and a staff does not need to input the instantiation parameter by using the NFVO. In this way, operation complexity of deploying the NS instance by using the management device is reduced, and an error caused by manually inputting the instantiation parameter is avoided.

In an embodiment, the NFVO sends an NSD information list to the management device. Because the NSD information list includes information about at least one NSD, the management device may determine the information about the NSD from the NSD information list based on an actual requirement. For example, if an NS needed by an OSS/BSS is a next generation mobile core network (Evolved Packet Core, EPC) service, the OSS/BSS may search the NSD information list for information about an NSD named related to the EPC service (for example, EPC or the next generation mobile core network service), and then select the information about the NSD.

In an embodiment, the information about the NSD includes information about at least one network service deployment flavour. In this way, the management device may determine the information about the network service deployment flavour from the information about the at least one network service deployment flavour based on a requirement of a to-be-deployed NS instance. For example, if a main function of the to-be-deployed NS instance is to store data, and information about a network service deployment flavour may implement the data storage function, the OSS/BSS may select the information about the network service deployment flavour.

In an embodiment, the information about the network service deployment flavour includes an identifier of the network service deployment flavour NSDF, an identifier of at least one virtualized network function descriptor VNFD, and/or an identifier of at least one physical network function descriptor PNFD. In this way, the management device may obtain, based on the identifier of the NSDF, the identifier of the at least one VNFD, and/or the identifier of the at least one PNFD, the instantiation parameter for deploying the NS instance.

In an embodiment, the identifier of the at least one VNFD includes an identifier of a first VNFD, and the NS instantiation request includes the identifier of the NSDF, the identifier of the first VNFD, and information about a first VNF instance. When the NFVO receives a VNF query request sent by the management device, and the VNF query request carries the identifier of the first VNFD and is used to request information about a VNF instance from the NFVO, the NFVO may send an information list of the first VNF instance to the management device. The information list of the first VNF instance includes information about at least one VNF instance obtained by instantiating the first VNFD. In this way, after receiving the information list of the first VNF instance from the NFVO, the management device obtains information about a reusable first VNF instance in the information list of the first VNF instance.

In an embodiment, the identifier of the at least one VNFD includes an identifier of a second VNFD, and the NS instantiation request further includes the identifier of the second VNFD and information about a VPC. When the NFVO receives a VPC query request sent by the management device, because the VPC query request is used to request the information about the VPC from the NFVO, the NFVO may send a VPC list to the management device. The VPC list includes information about at least one VPC, to enable the management device to determine the information about the VPC from the VPC list, where the VPC is used to deploy a second VNF instance created based on the second VNFD. In this way, if the VPC is used to deploy the second VNF instance created based on the second VNFD, the NS instantiation request may further include the identifier of the second VNFD and the information about the VPC.

In an embodiment, the NS instantiation request further includes the identifier of the PNFD and information that is about a PNF and that is indicated by the identifier of the PNFD, to enable the management device to determine the information about the VPC from the VPC list based on an actual requirement. A name in the information about the VPC is usually named based on a location of the VPC, for example, Dongxiao Street, Luohu District, Shenzhen. In an embodiment, the name in the information about the VPC may also be named by using a service of the VPC, for example, an IMS. The foregoing example is continuously used. The OSS/BSS may send the VPC query request to request that information about each available VPC should be included in a VPC information list sent by the NFVO to the OSS/BSS. In an embodiment, the OSS/BSS may send the VPC query request to request that information about an available VPC that meets a resource or location should be carried in the VPC information list sent by the NFVO to the OSS/BSS.

According to a third aspect, a management device is provided, configured to implement the method described in the first aspect. The management device may be an OSS/BSS or a CN NSSMF. For example, a management device includes a sending unit, a receiving unit, and a processing unit.

For an embodiment of a method for creating a network service NS, refer to descriptions in the first aspect. Details are not described again.

According to a fourth aspect, a communication apparatus is provided, configured to implement the method described in the second aspect. The communication apparatus is an NFVO. For example, the communication apparatus includes a receiving unit, a sending unit, and a processing unit.

For an embodiment of a method for creating a network service NS, refer to descriptions in the second aspect. Details are not described again.

It should be noted that, function modules in the fourth aspect and the third aspect may be implemented by hardware, or may be implemented by hardware by executing corresponding software. The hardware or software includes one or more modules corresponding to the foregoing functions. For example, a transceiver is configured to complete functions of the receiving unit and the sending unit, a processor is configured to complete a function of the processing unit, and a memory is configured to store program instructions used by the processor to perform the methods in this application. The processor, the transceiver, and the memory are connected through a bus and implement mutual communication. For details, refer to functions of behavior of the management device or the NFVO in the method in the first aspect to the method in the fourth aspect.

According to a fifth aspect, this application further provides a management device, configured to implement the method described in the first aspect. The management device includes a chip system. For example, the management device includes a processor, configured to implement functions in the method described in the first aspect or the third aspect. The management device may further include a memory, configured to store program instructions and data. The memory is coupled to the processor. The processor may invoke and execute the program instructions stored in the memory, to implement the functions in the method described in the first aspect or the third aspect. The management device may further include a communication interface, and the communication interface is used by the communication apparatus to communicate with another device. For example, the management device is an OSS/BSS or a CN NSSMF.

In a possible device, the communication interface may be a transceiver. For details, refer to descriptions of the foregoing aspects. Details are not described again.

According to a sixth aspect, this application further provides a communication apparatus, configured to implement the method described in the second aspect. The communication apparatus is an NFVO. For example, the communication apparatus includes a processor, configured to implement functions in the method described in the second aspect. The communication apparatus may further include a memory, configured to store program instructions and data. The memory is coupled to the processor. The processor may invoke and execute the program instructions stored in the memory, to implement the functions in the method described in the second aspect. The communication apparatus may further include a communication interface, and the communication interface is used by the communication apparatus to communicate with another device.

In a possible device, the communication interface may be a transceiver. The processor is configured to deploy a first virtual machine on a first server based on a first virtual resource template indicated by an identifier of the first virtual resource template, or deploy a second virtual machine on a second server based on a second virtual resource template indicated by an identifier of the second virtual resource template.

According to a seventh aspect, this application further provides a computer-readable storage medium, including computer software instructions. When the computer software instructions are run on a management device, the management device is enabled to perform the method in the first aspect.

According to an eighth aspect, this application further provides a computer-readable storage medium, including computer software instructions. When the computer software instructions are run on a communication apparatus, the communication apparatus is enabled to perform the method in the second aspect.

According to a ninth aspect, this application further provides a computer program product including instructions. When the computer program product is run on a communication apparatus, a management device is enabled to perform the method in the first aspect.

According to a tenth aspect, this application further provides a computer program product including instructions. When the computer program product is run on a communication apparatus, the communication apparatus is enabled to perform the method in the second aspect.

According to an eleventh aspect, this application provides a chip system. The chip system includes a processor, and may further include a memory, configured to implement a function of an OSS/BSS or an NFVO in the foregoing method. The chip system may include a chip, or may include a chip and another discrete component.

According to a twelfth aspect, this application further provides a communication system. The communication system includes the management device described in the third aspect and the communication device described in the fourth aspect.

In addition, for technical effects of designs of any of the foregoing aspects, refer to the technical effects of the different designs in the first aspect and the second aspect. Details are not described herein again.

8

DESCRIPTION OF EMBODIMENTS

In this specification, the claims, and the accompanying drawings of this application, terms "first", "second", "third", and the like are intended to distinguish between different objects but do not limit a particular order.

In embodiments of this application, a word such as "example" or "for example" represents giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a relative concept in a manner.

For clear and brief description of the following embodiments, a related technology is briefly described first.

A conventional telecommunication system includes various dedicated hardware devices, and different hardware devices are used for different functions. As a network scale grows, the telecommunication system becomes more complex, which brings a plurality of challenges, for example, development and rollout of a new service, operation and maintenance of the system, and resource utilization. To address these challenges and use a virtualization technology and a cloud computing technology in the internet technology (IT) industry, 13 major telecom operators around the world jointly released a network function virtualization (NFV) white paper, and announced establishment of an NFV industry specific group (ISG) in the European telecommunications standards institute (ETSI) to formulate a requirement and a technical framework of NFV, and promote NFV development.

In an NFV technology, the virtualization technology is used to perform resource pooling and virtualization on infrastructure hardware devices (such as a computing device, a storage device, and a network device), to provide a virtual resource for an upper-layer application, and decouple software from hardware. When a new service is developed, a hardware device does not need to be deployed independently. Instead, the virtualization technology needs to be used to virtualize the service into an independent application (for example, a VNF). This greatly shortens rollout time of the new service and greatly increases a virtual resource provisioning speed.

In the NFV technology, the cloud computing technology is used to scale an application, and match a virtual resource with service load. This improves utilization efficiency of the virtual resource, and also improves a response speed of an NFV system.

Figure 1:
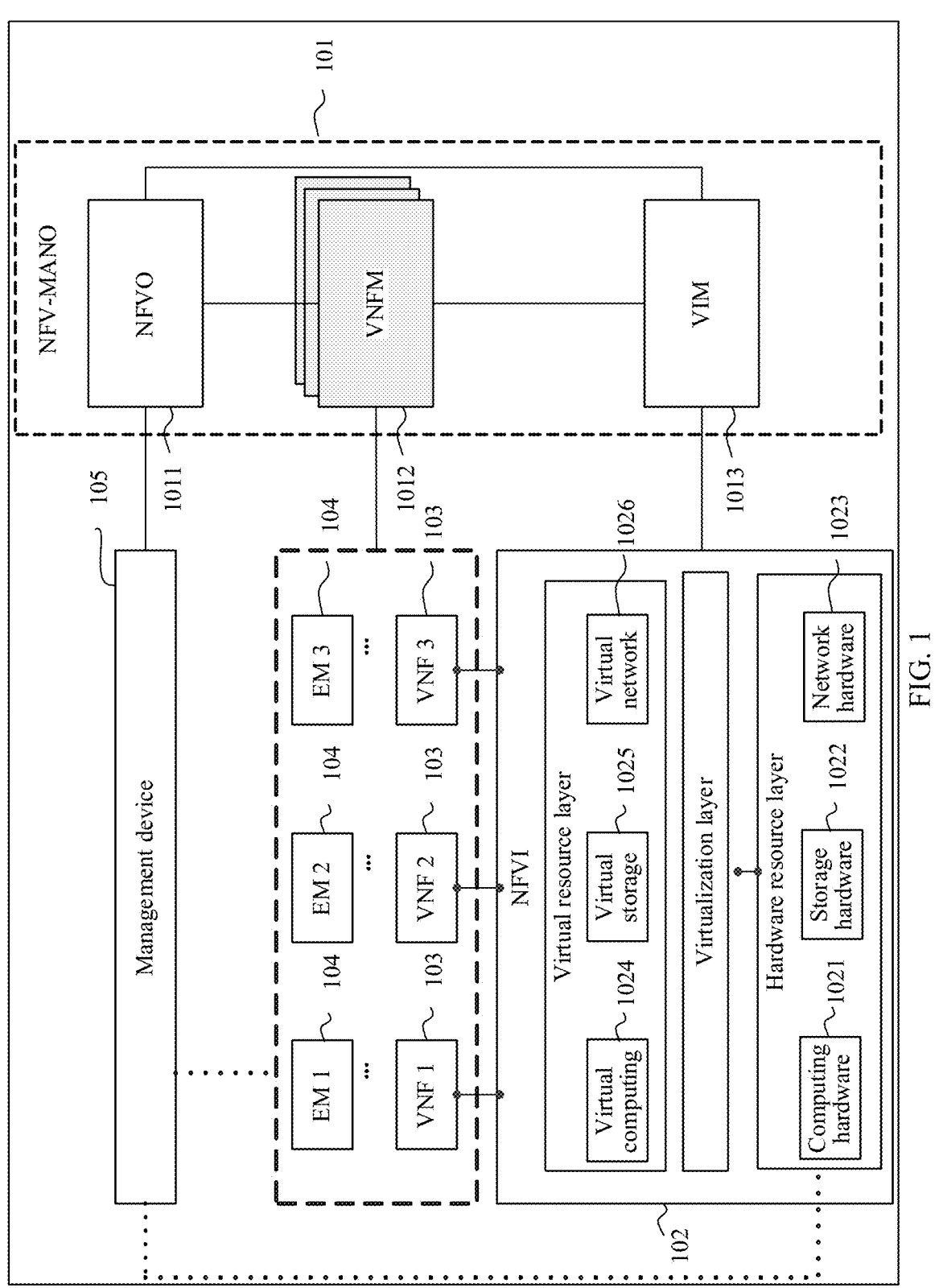
FIG. 1 is an example of an architecture of an NFV system according to an embodiment of this application.

FIG. 1 is an example of an architecture of an NFV system according to an embodiment of this application. The NFV system can be used in various networks, for example, implemented in a data center network, a telecom operator network, or a local area network. The NFV system includes one NFV management and orchestration (NFV management and orchestration, NFV MANO) system 101, an NFV infrastructure (NFV infrastructure, NFVI) layer 102, a plurality of virtual network functions (VNFs) 103, a plurality of Equipment management (EM) 104, and a management device 105.

The NFV MANO 101 is configured to monitor and manage the NFVI 102 and the VNF 103. The NFV management and orchestration system 101 includes an NFV orchestrator (NFVO) 1011, one or more VNF managers (VNFMs) 1012, and a virtualized infrastructure manager (VIM) 1013.

The NFVO 1011 is mainly responsible for processing life cycle management on a virtualization service, allocating and scheduling virtual resources in a virtual infrastructure and the NFVI, and the like. The NFVO 1011 may also receive a network service descriptor NSD query request sent by a management device. The NSD query request is used to request information about an NSD from the NFVO. Then the NFVO 1011 sends the information about the NSD to the management device. The information about the NSD includes information about a network service deployment flavour, and the information about the network service deployment flavour indicates a deployment flavour of a user for a network service. The NFVO 1011 receives an NS instantiation request sent by the management device based on the information about the network service deployment flavour. In this way, the NFVO may create an NS instance related to the NSD based on the NS instantiation request.

The VNFM 1012 is mainly responsible for life cycle management on one or more VNFs 103, for example, instantiating, updating, querying, auto scaling, or terminating the VNF 103. The VNFM 1012 may communicate with the VNF 103 to complete life cycle management on the VNF 103 and exchange configuration and status information. A plurality of VNFMs 1012 may exist in the NFV system, and are responsible for performing life cycle management on VNFs of different types. In addition, after completing instantiation of a VNF, the VNFM 1012 may further send an IP address of a virtual machine or a container of the VNF instance to the NFVO 1011.

The VIM 1013 may perform resource management functions, such as a function of managing infrastructure resource allocation (for example, adding a resource to a virtual container) and an operation function (for example, collecting NFVI fault information). The VNFM 1012 and the VIM 1013 may communicate with each other to allocate the resource and exchange configuration and status information of a virtualized hardware resource, for example, control and manage interaction between the VNF 103 and computing hardware 1021, storage hardware 1022, network hardware 1023, virtual computing 1024, virtual storage 1025, and a virtual network 1026.

The NFVI 102 includes a hardware resource layer, a virtualization layer, and a virtual resource layer. The NFVI 102 includes a hardware resource, a software resource, or a combination of the hardware resource and the software resource, to complete deployment of a virtualized environment. In other words, the hardware resource and the virtualization layer are used to provide a virtualized resource for the VNF 103, for example, the virtualized resource is used as a virtual machine or a virtual container in another form. The hardware resource layer includes the computing hardware 1021, the storage hardware 1022, and the network hardware 1023. The computing hardware 1021 may be existing hardware in the market and/or customized hardware, and is configured to provide processing and computing resources. The storage hardware 1022 may be a storage capacity provided in a network or a storage capacity (a local memory in a server) of the storage hardware 1022. In an embodiment, resources of the computing hardware 1021 and the storage hardware 1022 may be aggregated. The network hardware 1023 may be a switch, a router, and/or any other network device that is configured to provide a switching function. The network hardware 1023 may cross a plurality of domains, and may include a plurality of networks interconnected by using one or more transport networks. The virtualization layer in the NFVI 102 may abstract a hardware resource from a physical layer and decouple from the VNF

103, to provide a virtualized resource to the VNF 103. The virtual resource layer includes the virtual computing 1024, the virtual storage 1025, and the virtual network 1026. The virtual computing 1024 and the virtual storage 1025 may be provided to the VNF 103 in a form of a virtual machine and/or another virtual container. For example, the one or more VNFs 103 may be deployed on one virtual machine (VM). The virtualization layer abstracts the network hardware 1023 to form the virtual network 1026. The virtual network 1026 may include a virtual switch, and the virtual switch is configured to provide a connection between the virtual machine and another virtual machine. In addition, the transport network in the network hardware 1023 may be virtualized by using a centralized control plane and an independent forwarding plane (for example, software-defined networking).

In terms of hardware, the computing hardware 1021, the storage hardware 1022, and the network hardware 1023 may include a plurality of subracks, a plurality of racks, or even a plurality of equipment rooms. In terms of software, there may be one VIM 1013 or a plurality of VIMs that separately manage different hardware resources.

The VNF 103 is a virtualized network function instance.

In a conventional network, the equipment management (EM) system 104 is a system configured to perform configuration and management on a device. In the NFV system, the EM 104 may also be configured to perform configuration and management on the VNF 103, and initiate a life cycle management operation such as instantiation of a new VNF 103 to the VNFM 1012.

The management device 105 is configured to support various end-to-end telecommunication services for a user. The management device 105 includes an operations support system and a business support system (OSS/BSS), and a core network-network slice subnet management function (CN NSSMF). The OSS/BSS is used as an example. The OSS supports management functions such as network configuration, service provisioning, and fault management. The BSS is configured to process an order, payment, income, and the like, and supports product management, order management, profit management, customer management, and the like.

The management device 105 may also send the NSD query request to the NFVO. The NSD query request is used to request the information about the NSD from the NFVO. Then the management device 105 receives the information about the NSD sent by the NFVO. The information about the NSD includes the information about the network service deployment flavour, and the information about the network service deployment flavour indicates the deployment flavour of the user for the network service. Then the management device 105 sends the NS instantiation request to the NFVO based on the information about the network service deployment flavour, to request the NFVO to create the NS instance related to the NSD.

In the NFV system, a virtualized network service (NS) may be an IP multimedia subsystem (IMS) network service, a next generation mobile core network (EPC) network service, or the like. One NS may include several VNFs. When virtualization deployment is performed on one NS, a virtualization service provider needs to obtain description information of the service, namely, a network service template (NSD), from a virtualization service requestor. The NSD mainly describes topology structure information of the service and description information of each included VNF, namely, a VNFD. In the topology structure information, a virtual link template (VLD) may be used to describe a connection between the VNFs. The virtualization service requestor may be the NFVO or a sender. The sender may be an OSS/BSS.

According to the system shown in FIG. 1, the management device 105 sends the NSD query request to the NFVO 1011, and then receives the information about the NSD from the NFVO 1011. The information about the NSD includes the information about the network service deployment flavour, the management device 105 may determine an instantiation parameter based on the information about the network service deployment flavour, to request the NFVO 1011 to create the NS instance, and a staff does not need to input the instantiation parameter by using the NFVO 1011. In this way, operation complexity of deploying the NS instance by using the management device 105 is reduced, and an error caused by manually inputting the instantiation parameter is avoided.

In the following embodiments, an example in which the management device 105 is an OSS/BSS is used for description.

Figure 2:
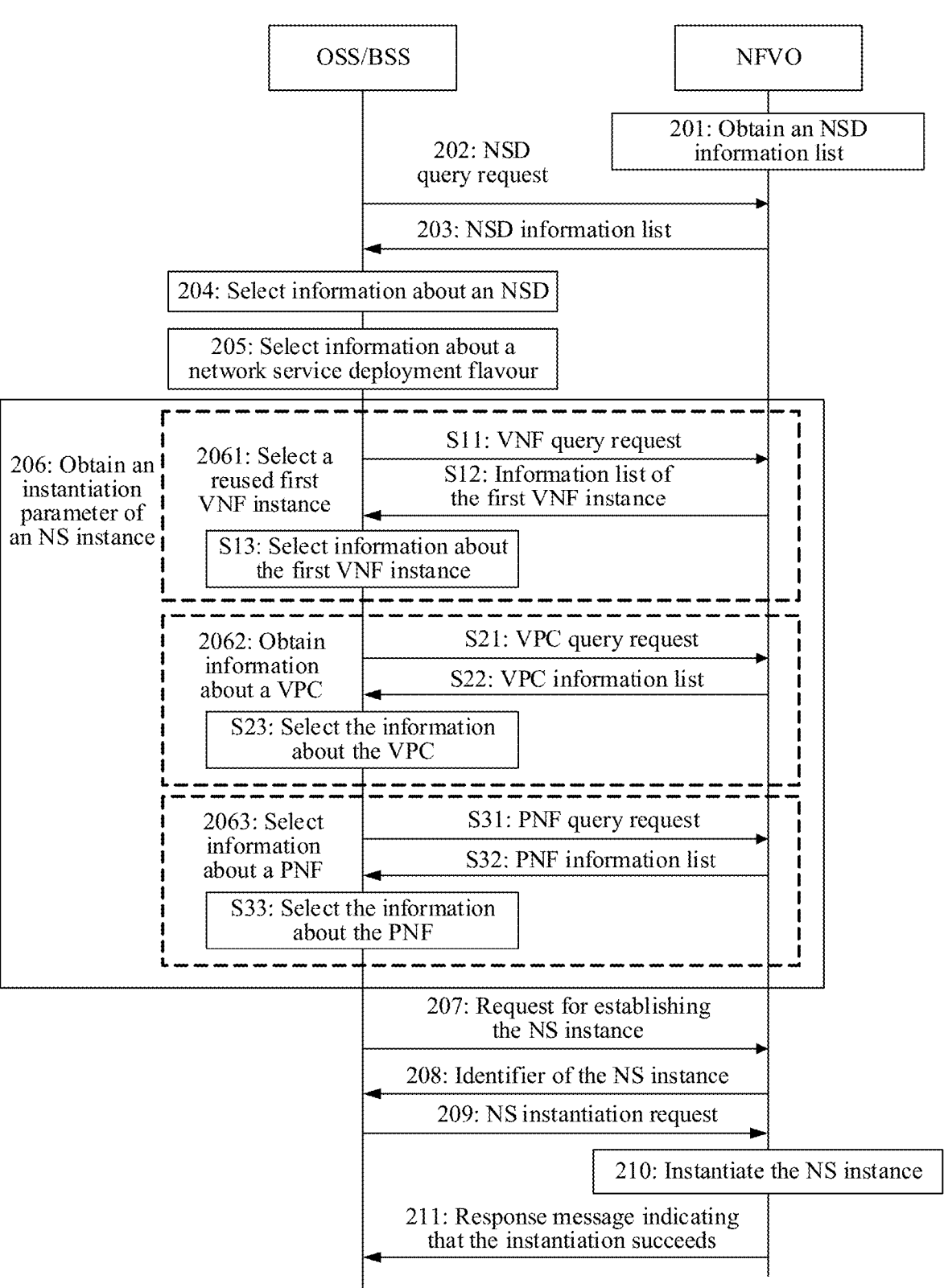
FIG. 2 is a flowchart of a method for creating a network service NS according to an embodiment of this application.

FIG. 2 is a flowchart of a method for creating a network service NS according to an embodiment of this application. As shown in FIG. 2, the method may include the following operations.

201: An NFVO obtains an NSD information list, and the NSD information list includes information about at least one NSD.

In an embodiment, a data format of an NSD file may be a data compression file format zip, and zip is a file format for data compression and document storage, and usually uses ".zip" as a file name extension.

In an embodiment of the application, the NFVO may receive an uploaded NSD file, and parse the NSD file to obtain information about an NSD. The NFVO stores the information about the NSD as information about one NSD in the NSD information list. The NSD information list includes the information about the at least one NSD, and information about each NSD may include information about a network service deployment flavour.

In an embodiment, the information about the NSD may be information in which the information about the network service deployment flavour is added based on NsdInfo in the <<ETSI GS NFV-IFA 014>> standard. In an embodiment, for detailed content of the NsdInfo, refer to attributes of an NsdInfo information element in the <<ETSI GS NFV-IFA 014>> standard (Table 1: Attributes of the NsdInfo information element).

For example, refer to Table 2-1. The information about the NSD may be the NsdInfo, and the NsdInfo may further include an NSDF (1 . . . N), an nsdInfoId (1), an nsdId (0 . . . 1) and a Name (0 . . . 1).

TABLE 2-1

| Attribute | Quantity | Content | Description |
|---|---|---|---|
| nsdInfoId | 1 | Identifier | Indicates an identifier of information about an NSD |
| nsdId | 0 . . . 1 | Identifier | Indicates an identifier of an online NSD |
| Name | 0 . . . 1 | Character string | Indicates a name of the online NSD |
| NSDF | 1 . . . N | Information about the NSDF | Indicates a deployment flavour within a scope of the NSD |

The nsdInfoId represents an identifier of the nsdInfo, namely, the identifier of the information about the NSD. The nsdId represents the identifier of the online NSD. The quantity of the nsdId is 0 or 1 (0 . . . 1). If the NSD is online, the quantity is 1. Otherwise, the quantity is 0. The Name represents a name of the NSD (which may be a name in a natural language, for example, "switch", or may be a name in a non-natural language, for example, "↔"), and the quantity of the name is 0 or 1 (0 . . . 1). If the NSD is online, the quantity is 1. Otherwise, the quantity is 0. The NSDF represents the information about the network service deployment flavour, and 1 or N (1 . . . N) NSDFs represent information about at least one network service deployment flavour.

In the attributes of the NsdInfo information element in the <<ETSI GS NFV-IFA 014>> standard (Table 1: Attributes of the NsdInfo information element), the NsdInfo may further include other information, for example, a version, a designer, a nestedNsdInfoId and artifacts. Details are not described herein.

The following describes information about one network service deployment flavour in detail.

For example, for the information about the network service deployment flavour, refer to content described in attributes of an NSDF information element in the <<ETSI GS NFV-IFA 014>> standard (Table 6.3.2.2-1: Attributes of the NSDF information element). For details, refer to Table 2-2.

TABLE 2-2

| Attribute | Quantity | Content | |
|---|---|---|---|
| NSDFId | 1 | Identifier | Indicates an identifier of the NSDF information element, used to represent a deployment flavour in the NSD |
| vnfProfile | 0 . . . N | Information about the VnfProfile | Indicates a VNF configuration file used for an NS deployment flavour |
| pnfProfile | 0 . . . N | Information about the PnfProfile | Indicates a PNF configuration file used for the NS deployment flavour |

In the attribute column, the NSDFId represents an identifier of the NSDF, the quantity of the NSDFId is 1, and the NSDFId is a unique identifier of the NSDF; the vnfProfile represents the information about the vnfProfile, and the quantity of the vnfProfile is 0 . . . N, representing information about 0 or N vnfProfiles; and the pnfProfile represents the information about the pnfProfile, and the quantity of the pnfProfile is 0 . . . N, representing information about 0 or N pnfProfiles.

It should be noted that, one vnfProfile corresponds to one VNFD, and is used to represent one group of VNF instances. Each VNF instance in the group of VNF instances is obtained by instantiating a corresponding VNFD. An OSS/BSS may query one group of VNF instances that performs instantiation by using a VNFD, and then select to reuse these VNF instances for a created NS instance, or may create a new VNF instance based on the VNFD corresponding to the VnfProfile. One pnfProfile corresponds to one PNFD, and is used to represent one group of PNFs. Each PNF in the group of PNFs is associated with the PNFD corresponding to the pnfProfile. The OSS/BSS may query the one group of VNF instances associated with the PNFD, and then select to reuse these PNFs for the created NS instance.

For example, for the information about the vnfProfile, refer to content described in attributes of a VnfProfile information element in the <<ETSI GS NFV-IFA 014>> standard (Table 6.3.3.2-1: Attributes of the VnfProfile information element). In an embodiment, as shown in Table 2-3, the vnfProfile includes a vnfProfileId and a VNFDId, the vnfProfileId is a unique identifier of the vnfProfile, and the VNFDId is a unique identifier of the VNFD corresponding to the vnfProfile.

TABLE 2-3

| Attribute | Quantity | Content | Description |
|---|---|---|---|
| vnfProfileId | 1 | Identifier | Indicates an identifier of the VnfProfile information element, and is a unique identifier of the VnfProfile |
| vnfdId | 1 | Identifier of the VNFD | Indicates the identifier of the VNFD |

It should be noted that, the VNFD is VNF-related description information, and is also referred to as a VNF deployment template. The VNFD includes information such as a virtualization deployment unit (VDU), a connection point (connection point, CP), and a virtual link (VL). The VDU may represent a virtual machine on which application software is installed. Descriptions of the VDU include requirement descriptions of all virtual resources of the virtual machine. The CP represents connection information on the virtual machine, for example, virtual network interface card information, and may be represented by using an IP address or a MAC address. The VL is a virtual link that connects to a plurality of VDUs in the VNF, and may be represented by using information such as a connection type or bandwidth.

For example, for the information about the PnfProfile, refer to content described in attributes of a PnfProfile information element in the <<ETSI GS NFV-IFA 014>> standard (Table 6.3.6.2-1: Attributes of the PnfProfile information element). In an embodiment, as shown in Table 2-3, the PnfProfile includes a PnfProfileId and a PnfdId, the PnfProfileId is a unique identifier of the PnfProfile, and the PnfdId is a unique identifier of the PNFD corresponding to the PnfProfileId.

TABLE 2-4

| Attribute | Quantity | Content | Description |
|---|---|---|---|
| pnfProfileId | 1 | Identifier | Indicates an identifier of the pnfProfile information element, and is a unique identifier of the pnfProfile |
| pnfdId | 1 | Identifier of the PNFD | Indicates the identifier of the PNFD |

It should be noted that the PNFD is pnf-related description information, and is also referred to as a deployment template of the pnf.

202: The OSS/BSS sends an NSD query request to the NFVO, and the NSD query request is used to request the information about the NSD from the NFVO.

For example, the OSS/BSS may send the NSD query request to the NFVO by using "Query NSDGET ns_descriptors" in an Os-Ma-nfvo interface. The Os-Ma-nfvo is a common interface in a current NFV system. For details, refer to the gs_nfv_ifa013 7.2.7Query NSD Info operation standard. Details are not described herein.

For example, the information about the NSD may be the NsdInfo shown in Table 2-1, and the NSD query request may be shown in Table 2-5.

TABLE 2-5

| Os-Ma-nfvo interface | Returned parameter |
|---|---|
| Query NSD GET ns_descriptors | NsdInfo list |

It should be noted that the NSD query request is sent by using the "Query NSDGET ns_descriptor" in the Os-Ma-nfvo interface, and the returned parameter is the "NsdInfo list", representing the NSD information list.

In an embodiment, the input parameter may also be one or more NsdInfo identifiers, representing that the OSS/BSS requests, from the NFVO, one or more NsdInfo corresponding to the one or more NsdInfo identifiers.

203: The NFVO sends the NSD information list to the OSS/BSS, and the NSD information list includes the information about the at least one NSD.

After receiving the NSD query request sent by the OSS/BSS, the NFVO returns the NSD information list based on the NSD query request. The NSD information list includes the information about the at least one NSD.

The example in operation 202 is continuously used. The NsdInfo list returned by the NFVO to the OSS/BSS may be an information list of all NSDs obtained by the NFVO in operation 201. Alternatively, the "one or more NsdInfo identifiers" may be carried in the NSD query request. In this way, the NsdInfo list returned by the NFVO to the OSS/BSS includes the one or more NsdInfo corresponding to the one or more NsdInfo identifiers in the NSD information list obtained by the NFVO in operation 201.

204: The OSS/BSS selects the information about the NSD from the NSD information list. The information about the NSD includes an information list of the network service deployment flavour, and the information list of the network service deployment flavour includes the information about the at least one network service deployment flavour.

After receiving the NSD information list, the OSS/BSS may select information about a needed NSD based on an actual requirement for the NS instance. For example, when receiving a plurality of NSD information lists shown in Table 2-1, if an NS needed by the OSS/BSS is a next generation mobile core network (Evolved Packet Core, EPC) service, the OSS/BSS may search the NSD information list for information about an NSD named related to the EPC service (for example, EPC or the next generation mobile core network service), and then select the information about the NSD.

Because the information about the NSD includes the information about the at least one network service deployment flavour, the OSS/BSS may further determine, based on the information about the network service deployment flavour in information about each NSD in the NSD information list, whether to select the information about the NSD. This is not limited herein.

The example in operation 203 is continuously used. If the NSD information list is the NsdInfo list, the OSS/BSS may select one piece of NsdInfo based on a requirement for creating the NS instance, and the selected NsdInfo includes 1 . . . N NSDFs, namely, the information list of the network service deployment flavour.

205: The OSS/BSS determines the information about the network service deployment flavour from the information about the at least one network service deployment flavour. The information about the network service deployment flavour indicates a deployment flavour of a user for a network service.

In an embodiment of the application, after obtaining the information about the at least one network service deployment flavour, the OSS/BSS may select the information about the network service deployment flavour based on a requirement of a to-be-deployed NS instance. The example in operation 204 is continuously used. The information list of the network service deployment flavour may be 1 . . . N NSDFs shown in Table 2-1. In this way, the OSS/BSS may select one NSDF from the 1 . . . N NSDFs based on the requirement of the to-be-deployed NS instance. For example, if a main function of the to-be-deployed NS instance is to store data, and an NSDF may implement the data storage function, the OSS/BSS may select the NSDF.

206: The OSS/BSS obtains an instantiation parameter of the NS instance based on the information about the network service deployment flavour.

It should be noted that the NS instantiation needs the instantiation parameter. In an embodiment, the instantiation parameter may include information about a reused first VNF instance, a VPC for creating a second VNF instance, and/or a PNF for creating the NS instance.

The example in operation 204 is continuously used. As shown in Table 2-1, the information about the network service deployment flavour selected by the OSS/BSS may be the NSDF. The NSDF includes the identifier of the NSDF, content of 0 . . . N vnfProfiles, and information about 0 . . . N pnfProfiles (as shown in Table 2-2). Information about each vnfProfile includes the identifier of the VNFD (as shown in Table 2-3), and information about each pnfProfile includes the identifier of the PNFD (as shown in Table 2-4). The OSS/BSS may select to reuse or create one or more VNF instances for the information about each vnfProfile based on the requirement of the created NS instance.

The following uses an example for description. It is assumed that an identifier of at least one VNFD includes an identifier of a first VNFD and/or an identifier of a second VNFD. The OSS/BSS selects, by using the identifier of the first VNFD, the first VNF instance that needs to be reused, and creates the new second VNF instance by using the identifier of the second VNFD.

2061: The OSS/BSS selects, based on the identifier of the first VNFD, the information about the reused first VNF instance.

The information about the reused first VNF instance is selected by using the following operations S21 to S23.

S11: The OSS/BSS sends a VNF query request to the NFVO. The VNF query request carries the identifier of the first VNFD, and is used to request information about a VNF instance from the NFVO.

For example, as shown in Table 2-6, the VNF query request may be sent by using Query VNFGET vnfs/{VNF-Did} in the Os-Ma-nfvo interface. An input parameter of the VNF query request is a VNFDid, indicating the identifier of the first VNFD. A returned parameter is Vnfinstance[0 . . . N], indicating an information list of the VNF instance. The "0 . . . N" represents the quantity of the VNF instance.

TABLE 2-6

| Os-Ma-nfvo interface | Input parameter | Returned parameter |
|---|---|---|
| Query VNF GET vnfs/{VNFDid} | VNFDid | Vnfinstance[0 . . . N] |

S12: The NFVO sends an information list of the first VNF instance to the OSS/BSS. The information list of the first VNF instance includes information about at least one VNF instance obtained by instantiating the first VNFD.

In an embodiment of the application, after receiving the VNF query request, the NFVO determines, based on the identifier of the VNFD in the VNF query request, the information about the at least one VNF instance obtained by instantiating the VNFD, to obtain the information list of the first VNF instance, and then sends the information list of the first VNF instance to the OS S/BSS. In this application, the VNF instance obtained by using the identifier of the VNFD is referred to as the first VNF instance, and an identifier of a VNFD corresponding to the first VNF instance is referred to as the identifier of the first VNFD.

The example in operation S11 is continuously used. After receiving the VNF query request in Table 2-6, the NFVO may obtain the input parameter VNFDid (namely, the identifier of the first VNFD) from the VNF query request, and then determine the information about the at least one VNF instance (VnfInstance[0 . . . N]) based on the VNFDid, where the at least one VNF instance is a VNF instance obtained by instantiating the VNFD corresponding to the VNFDid (namely, the first VNFD), and obtain information about these VNF instances, in other words, obtain the information list of the first VNF instance. Then, the NFVO sends the information list of the first VNF instance to the OSS/BSS.

It should be noted that the information list of the first VNF instance includes the information about the at least one VNF instance. Refer to Table 2-7.

TABLE 2-7

| Attribute | Quantity | Content | Description |
|---|---|---|---|
| vnfInstanceId | 1 | Identifier | Indicates an identifier of a VNF instance |
| vnfName | 1 | Character string | Indicates a name of the VNF instance |

The vnfInstanceId represents the identifier of the VNF instance, and the vnfName represents the name of the VNF instance (which may be a name in the natural language, for example, "switch", or may be a name in the non-natural language, for example, "↔").

S13: The OSS/BSS determines the information about the first VNF instance from the information list of the first VNF instance.

After receiving the information list of the first VNF instance, the OSS/BSS may determine information about one or more VNF instances from the information list as information about a reusable first VNF instance. It should be noted that, the "reusable first VNF instance" indicates that the first VNF instance has been instantiated, and may be selected and reused by a newly created NS instance. In an embodiment, "reuse" indicates using an existing VNF instance as a VNF instance of a to-be-created NS instance. In other words, the to-be-created NS instance reuses the first VNF instance, indicating that the NS instance includes the first VNF instance.

For example, an NS instance A is an existing NS instance, and an NS instance B is a to-be-created NS instance. The NS instance A includes an instantiated VNF instance A. When the NS instance B is created, the VNF instance A is used as a VNF instance of the NS instance B. That is, the VNF instance A is reused. From another perspective, after the NS instance B is created, the NS instance B includes a VNF instance B. The VNF instance B and the VNF instance A have a same parameter and a same VPC. In other words, the VNF instance B and the VNF instance A belong to a same VNF instance. That is, the NS instance B reuses the VNF instance A.

In an embodiment, the OSS/BSS may select the information about the one or more VNF instances based on the requirement of the to-be-deployed NS instance. For example, the OSS/BSS may determine, based on the vnf-Name of a VNF instance, whether to select the VNF instance. In an embodiment, the information about the first VNF instance may further include a rule, an available resource, a service capability, a location, and/or the like of the first VNF instance. The OSS/BSS may also determine, based on one or more of the information, whether to reuse the first VNF instance in the NS instance.

It should be noted that, because a quantity of the information about the VNF instance in the information list of the first VNF instance is 0 . . . N, when the quantity is 0, and one piece of information cannot be selected from the information list, the OSS/BSS may create a first VNF instance based on the identifier of the first VNFD. In this application, for convenience, a VNF instance that needs to be created is referred to as the second VNF instance, and an identifier of a VNFD that does not obtain a VNF instance is referred to as the identifier of the second VNFD. Therefore, the identifier of the at least one VNFD includes the identifier of the second VNFD.

It should be noted that, when the quantity of the information about the VNF instance in the information list of the first VNF instance is not equal to 0, if there is no proper VNF instance in the information list of the first VNF instance, the OSS/BSS may also create the second VNF instance based on the identifier of the second VNFD. In this case, the OSS/BSS needs to obtain a VPC, and then deploy the second VNF instance on the VPC.

2062: The OSS/BSS obtains information about the VPC based on the identifier of the second VNFD.

The information about the VPC is obtained by using the following operations S21 to S23.

S21: The OSS/BSS sends a VPC query request to the NFVO, and the VPC query request is used to request the information about the VPC from the NFVO.

It should be noted that a VPC needs to be specified for creating a new VNF instance. Therefore, the OSS/BSS first needs to obtain information about an available VPC.

For example, the VPC query request may be shown in Table 2-8, and is sent by using Query VPCGET vpcs in the Os-Ma-nfvo interface. A returned parameter is String[0 . . . N], indicating that a data type of the VPC query request is a character string, and the quantity of the character string is 0 . . . N. The String[0 . . . N] represents a VPC information list.

TABLE 2-8

| Os-Ma-nfvo interface | Returned parameter |
| --- | --- |
| Query VPC GET vpcs | String[0 . . . N] |

In an embodiment, the VPC query request may further include some restrictions (for example, a resource or a location of a VPC), to request, from the NFVO, information about a VPC that meets the restrictions. The foregoing example is continuously used. The OSS/BSS sends the VPC query request by using the Query VPCGET vpcs in the Os-Ma-nfvo interface. The VPC query request carries the location (for example, Shenzhen or Nanjing) of the VPC, to request, from the NFVO, information about a VPC that meets the location. In an embodiment, the VPC query request carries the character string, to request, from the NFVO, information about a VPC whose name has the character string.

S22: The NFVO sends the VPC information list to the OSS/BSS, and the VPC information list includes information about at least one VPC.

In an embodiment of the application, after receiving the VPC query request sent by the OSS/BSS, the NFVO may return the VPC information list. The VPC information list includes the information about the at least one VPC, and the information about the VPC includes a name and an identifier. A name in the information about the VPC is usually named based on a location of the VPC, for example, Dongxiao Street, Luohu District, Shenzhen. In an embodiment, the name in the information about the VPC may also be named by using a service of the VPC, for example, an IMS.

The foregoing example is continuously used. The OSS/BSS may send the VPC query request to request that information about each available VPC should be included in the VPC information list sent by the NFVO to the OSS/BSS. In an embodiment, the OSS/BSS may send the VPC query request to request that information about an available VPC that meets a resource or location should be carried in the VPC information list sent by the NFVO to the OSS/BSS.

S23: The OSS/BSS determines the information about the VPC from the VPC information list.

After receiving the VPC information list, the OSS/BSS may select information about one or more VPCs from the VPC information list as the VPC used for creating the second VNF instance.

In an embodiment, the OSS/BSS may determine, based on the requirement of the to-be-deployed NS instance, whether to select one VPC. In an embodiment, the OSS/BSS may determine, based on the name in the information about the VPC, whether to select the VPC. For example, if the OSS/BSS is located in Shenzhen and a needed service is an IMS, the OSS/BSS may select a VPC whose name includes Shenzhen and/or the IMS.

2063: The OSS/BSS obtains information about the PNF based on the identifier of the PNFD.

It should be noted that, the current NFV system may provide a VNF service and a PNF service. The PNF is a node of physical hardware, and provides a service of a dedicated device. In an embodiment of the application, the NFV system may provide both the VNF service and/or the PNF service for selection by the OSS/BSS.

For example, in an NSD, two VNFDs are provided, and no PNFD is provided. If the OSS/BSS selects the NSD, the OSS/BSS needs to separately select a reused VNF instance or create a VNF instance based on the two VNFDs, and does not need to select a reused PNF. If one VNFD and one PNFD are provided in an NSD, and the OSS/BSS selects the NSD, the OSS/BSS needs to select a reused VNF instance or create a VNF instance based on the VNFD, and also needs to select a reused PNF based on the PNFD. If two PNFDs are provided in an NSD, and the OSS/BSS selects the NSD, the OSS/BSS needs to separately select a reused PNF based on the two PNFDs, and does not need to select to reuse a VNF instance or create a VNF instance. Usually, in a core network, a control plane function is usually deployed by using the VNF instance, and a user name function is usually deployed by using the PNF.

In an embodiment of the application, if the information about the network service deployment flavour selected by the OSS/BSS has the pnfprofile, the OSS/BSS may obtain the identifier of the PNFD, and request the information about the PNF from a management system EM based on the identifier of the PNFD.

The information about the PNF is obtained by using the following operations S31 to S33.

S31: The OSS/BSS sends a PNF query request to the device EM. The PNF query request carries the identifier of the PNFD, and is used to request the information about the PNF from the NFVO.

The foregoing example is continuously used. It is assumed that the information about the network service deployment flavour is the NSDF in Table 2-1. The NSDF includes 0 . . . N pnfProfiles, each pnfProfile includes the pnfProfileId and the pnfdId, and the pnfdId is the identifier of the PNFD. In other words, an identifier of at least one PNFD includes the identifier of the PNFD.

In this way, the OSS/BSS may send the PNF query request to the EM. The PNF query request carries an identifier of one PNFD, and is used to request the information about the PNF associated with the identifier of the PNFD from the NFVO. As shown in Table 2-9, an input parameter of the PNF query request is a pnfdid (namely, the identifier of the PNFD), and a returned parameter is a pnf[0 . . . N], indicating a PNF information list. A quantity of the information about the PNF is 0 . . . N.

TABLE 2-9

| Input parameter | Returned parameter |
| --- | --- |
| pnfdid | pnf[0 . . . N] |

S32: The EM sends the PNF information list to the OSS/BSS. The PNF information list includes information about at least one PNF associated with the PNFD.

After receiving the PNF query request sent by the OSS/BSS, the EM may determine, based on the PNFD identifier in the PNF query request, the PNF information list associated with an identifier of a first PNFD, and then send the PNF information list to the OSS/BSS.

The foregoing example is continuously used. After receiving the PNF query request, the EM may obtain the input parameter pnfdid from Table 2-9, then determine the information about the at least one pnf (pnf [0 . . . 1N]) based on the pnfdid, where the information about the at least one pnf is associated with the PNFD identified by the pnfdid, and then send the information about the at least one pnf to the OSS/BSS.

For example, information about one PNF may be represented by using a field AddPnfData in the <<ETSI GS NFV-IFA 014>> standard, for example, attributes of an AddPnfData information element (Table 8.3.4.32.2-1: Attributes of the AddPnfData information element). Refer to Table 2-10.

TABLE 2-10

| Attribute | Quantity | Content | Description |
| --- | --- | --- | --- |
| pnfId | 1 | Identifier | Indicates an identifier of a PNF instance |
| pnfName | 1 | Character string | Indicates a name of the PNF instance |

TABLE 2-10-continued

| Attribute | Quantity | Content | Description |
| --- | --- | --- | --- |
| pnfdId | 1 | Identifier of a PNFD | Indicates an identifier of a PNF associated with the PNFD |
| pnfProfileId | 1 | Identifier of a pnfProfile | Indicates an identifier of an available pnfProfile |

The pnfId represents the identifier of the PNF, the pnfName represents the name of the PNF, the pnfdId represents the identifier of the PNFD, and the pnfProfileId represents the identifier of the pnfProfile. In an embodiment, the information about the PNF further includes a vendor, a version, and a type.

S33: The OSS/BSS determines the information about the PNF from the PNF information list.

After receiving the PNF information list, the OSS/BSS may select information about one or more PNFs from the PNF information list based on a requirement of the deployed NS instance. The foregoing example is continuously used. In an embodiment, the OSS/BSS may determine, based on the pnfName in the information about the PNF, whether to select the information about the PNF. The pnfName usually carries valid information of the PNF, for example, a function that can be implemented or a city in which the PNF is located. In this way, the OSS/BSS may determine, based on the pnfName, whether to select the PNF. In an embodiment, the OSS/BSS may also determine, based on the vendor, the version, and the type in the information about the PNF, whether to select the PNF.

In conclusion, by using the foregoing operations, the instantiation parameter for deploying the NS instance is obtained, for example, the information about the reusable first VNF instance, the VPC for creating the second VNF instance, and/or the PNF for creating the NS instance are obtained. The OSS/BSS does not need to parse the information, and in this way, computing overheads and signaling overheads are reduced. In addition, a staff does not need to manually input the instantiation parameter, and in this way, operation complexity of deploying the NS instance by using the OSS/BSS is reduced, and an error caused by manually inputting the instantiation parameter is avoided.

207: The OSS/BSS sends a request for establishing an NS instance to the NFVO.

In an embodiment of the application, the OSS/BSS may name the NS instance, and then send an NS creation request to the NFVO. The NS creation request message includes an identifier of information about a network service and the name of the NS instance, and is used to request the NFVO to create the NS instance.

The foregoing example is continuously used. The information about the network service is the nsdinfo. In this way, the NS creation request sent by the OSS/BSS to the NFVO carries the nsdinfoid and the nsName. For example, Table 2-11 shows a request for creating an ID of the NS instance.

TABLE 2-11

| Os-Ma-nfvo interface | Input parameter | Returned parameter |
| --- | --- | --- |
| Create NS Identifier | Nsdinfoid nsName | VPC list String[0 . . . N] |

The NS creation request message may be sent by using the Create NS Identifier in the Os-Ma-nfvo interface, the nsdinfoid is an identifier of the selected NsdInfo, and the nsName is the name of the NS instance.

208: The NFVO determines the identifier of the NS instance, and sends the identifier of the NS instance to the OSS/BSS.

After receiving the NS creation request, the NFVO may determine the NSD based on the identifier of the information about the network service, and create the ID of the NS instance based on the NSD. The example in operation 207 is continuously used. After receiving the NS creation request, the NFVO uses the identifier of the NSD as the identifier of the NS instance (nsInstanceId), and uses the nsName to name the NS instance. After establishing the identifier of the NS instance, the NFVO sends a response message to the OSS/BSS. The response message carries the identifier of the established NS instance (nsInstanceId) and the name of the NS instance (nsName).

209: The OSS/BSS sends an NS instantiation request to the NFVO. The NS instantiation request carries the identifier of the NS instance and the instantiation parameter.

In an embodiment of the application, after receiving the response message carrying the identifier of the NS instance, the OSS/BSS constructs the NS instantiation request by using the instantiation parameter obtained in operation 206.

In an embodiment, the instantiation parameter may include the identifier of the NSDF and at least one of the following: the identifier of the first VNFD and the information about the first VNF instance; the identifier of the second VNFD and the information about the VPC, where the NSDF includes the identifier of the second VNFD; and the identifier of the PNFD and the information about the PNF, where the NSDF includes the identifier of the PNFD.

For example, the example in Table 2-1 is continuously used. The NS instantiation request may be an input parameter of an NS instantiation operation in the <<ETSI GS NFV-IFA 014>> standard (Table 7.3.3.2-1: Instantiate NS operation input parameters). Refer to Table 2-12.

TABLE 2-12

| Attribute | Quantity | Content | Description |
|---|---|---|---|
| flavourId | 1 | Identifier of an NSDF | Identifies a deployment flavour of an NSD that instantiates an NS instance |
| addPnfData | 0 . . . N | Information about the AddPnfData | Indicates information about a PNF used to deploy the NS instance |
| vnfInstanceData | 0 . . . N | Information about the VnfInstanceData | Indicates a VNF instance specified to be reused in the NS instance, where if necessary, a VNF profile file may be provided for the VNF instance |
| additionalParamForVnf | 0 . . . N | Information about a ParamsForVnf | Indicates an additional parameter, including information about a created VNF instance |

The flavourId is used to represent the identifier of the NSDF, the addPnfData represents the information about the PNF, the vnfInstanceData represents the information about the reused first VNF instance, and the additionalParamFor-Vnf represents the information about the created second VNF instance. For example, the following separately describes the AddPnfData, the VnfInstanceData, and the additionalParamForVnf by using an example.

For example, the AddPnfData may be an attribute of the AddPnfData information element in the <<ETSI GS NFV-IFA 014>> standard (Table 8.3.4.32.2-1: Attributes of the AddPnfData information element). Refer to Table 2-13.

TABLE 2-13

| Attribute | Quantity | Content | Description |
|---|---|---|---|
| pnfId | 1 | Identifier | Indicates an identifier of a PNF, allocated by an OSS/BSS and provided for an NFVO. |
| pnfName | 0 . . . N | Character string | Indicates a name of the PNF in the natural language |
| pnfdId | 0 . . . N | Identifier of a PNFD | Indicates an identifier of the PNF associated with the PNFD |
| pnfProfileId | 0 . . . N | Identifier of a pnfProfile | Indicates the identifier of the pnfProfile of the to-be-used PNF |

The pnfId represents the identifier of the pnf, the pnfName represents the name of the selected PNF in the natural language, the pnfdId represents the identifier of the PNF associated with the PNFD, and the pnfProfileId represents an identifier of a pnfProfile corresponding to the PNF.

For example, the VnfInstanceData may be an attribute of a VnfInstanceData information element in the <<ETSI GS NFV-IFA 014>> standard (Table 8.3.4.3.2-1: Attributes of the VnfInstanceData information element). Refer to Table 2-14.

TABLE 2-14

| Attribute | Quantity | Content | Description |
|---|---|---|---|
| vnfInstanceId | 1 | Identifier | Indicates an identifier of a VNF instance that has been instantiated in an NS |

TABLE 2-14-continued

| Attribute | Quantity | Content | Description |
|---|---|---|---|
| vnfProfileId | 0 . . . 1 | Identifier of a vnfProfile | Indicates an identifier of a vnfProfile defined in an NSD, where the vnfProfile includes a first VNF instance, and if the identifier does not exist, the NFVO selects a VnfProfile that matches information about the first VNF instance |

The vnfInstanceId represents the identifier of the vnfInstance, namely, the identifier of the first VNF instance. The vnfProfileId represents the identifier of the vnfProfile, namely, the identifier of the first vnfProfile corresponding to the first VNF instance.

For example, the ParamsForVnf may be an attribute of a ParamsForVnf information element in the <<ETSI GS NFV-IFA 014>> standard (Table 8.3.4.5.2-1: Attributes of the ParamsForVnf information element). Refer to Table 2-15.

TABLE 2-15

| Attribute | Quantity | Content | Description |
|---|---|---|---|
| vnfProfileId | 1 | Identifier of a vnfProfile | Indicates an identifier that provides an additional parameter vnfProfile, namely, an identifier of a second vnfProfile |
| additionalParam | 0 . . . N | Key-value pair | Indicates other parameters to be applied to each VNF instance |

The vnfProfileId represents the identifier of the vnfProfile, namely, the identifier of the second VNF instance. The additionalParam represents the key-value pair, and may be used to carry information indicating a selected VPC.

210: The NFVO instantiates the NS instance based on the instantiation parameter.

After receiving the NS instantiation request, the NFVO determines the identifier of the NS instance, and then instantiates the NS instance based on the instantiation parameter. An instantiation process belongs to the conventional technology, and details are not described herein.

211: The NFVO sends, to the OSS/BSS, a response message indicating that the NS instantiation succeeds.

In an embodiment of the application, after completing the NS instantiation, the NFVO sends the response message indicating that the NS instantiation succeeds to the OSS/BSS, to complete a process of deploying the NS instance on the NFVO by using the OSS/BSS. Then, the OSS/BSS may use, through signaling interaction with the NFVO, a service provided by the NS instance.

In an embodiment of the application, the OSS/BSS sends the NSD query request to the NFVO, and then receives the information about the NSD from the NFVO. The information about the NSD includes the information about the network service deployment flavour, the OSS/BSS may determine the instantiation parameter based on the information about the network service deployment flavour, to request the NFVO to create the NS instance, and a staff does not need to input the instantiation parameter by using the NFVO. In this way, operation complexity of deploying the NS instance by using the OSS/BSS is reduced, and an error caused by manually inputting the instantiation parameter is avoided.

In the foregoing embodiments provided in this application, the methods provided in embodiments of this application are separately described from a perspective of interaction between nodes (the management device and the communication apparatus). It may be understood that, to implement functions in the methods provided in the foregoing embodiments of this application, each network element such as the management device and the communication apparatus includes a corresponding hardware structure and/or software module for performing the functions. One of ordinary skilled in the art should easily be aware that, in combination with algorithms and operations in the examples described in embodiments disclosed in this specification, this application can be implemented by hardware or a combination of hardware and computer software. Whether a function is performed by hardware or hardware driven by computer software depends on particular applications and design constraints of the technical solutions.

In embodiments of this application, the management device and the communication apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in embodiments of this application, module division is an example, and is merely a logical function division. In an embodiment, another division manner may be used.

Figure 3:
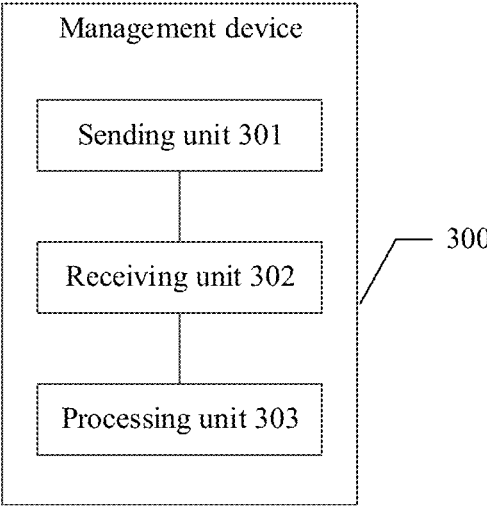
FIG. 3 is a schematic composition diagram of a management device according to an embodiment of the application.

In a case that functional modules are obtained through division based on corresponding functions, FIG. 3 shows a possible schematic composition diagram of the management device in the foregoing embodiments. The management device can perform operations performed by the OSS/BSS in the method embodiments of this application. As shown in FIG. 3, a management device 300 may include a sending unit 301, a receiving unit 302, and a processing unit 303.

The sending unit 301 is configured to perform or support the management device 300 in performing operations 202, S11, S21, S31, 207 and 209 performed by the OSS/BSS in the method shown in FIG. 2.

The receiving unit 302 is configured to support the management device 300 in performing the method performed by the OSS/BSS described in embodiments of this application. For example, the receiving unit 302 is configured to perform or support the management device 300 in performing operations 203, S12, S22, S32, 208, and 211 performed by the OSS/BSS in the method shown in FIG. 2.

The processing unit 303 is configured to perform or support the management device 300 in performing operations 204, 205, S13, S23, and S33 performed by the OSS/BSS in the method shown in FIG. 2. In this way, the management device 300 selects information about an NSD and information about a network service deployment flavour in the information about the NSD, and sends an NS instantiation request to an NFVO based on the information about the network service deployment flavour, to request the NFVO to create an NS instance related to the NSD.

Figure 4:
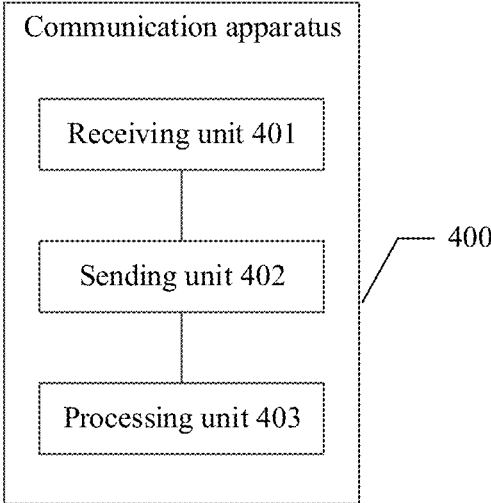
FIG. 4 is a schematic composition diagram of a communication apparatus according to an embodiment of the application.

In a case that functional modules are obtained through division based on corresponding functions, FIG. 4 shows a possible schematic composition diagram of the communication apparatus in the foregoing embodiments. As shown in FIG. 4, the communication apparatus 400 can perform the operations performed by the NFVO in the method embodiments of this application. The communication apparatus 400 may include a receiving unit 401, a sending unit 402, and a processing unit 403.

The receiving unit 401 is configured to support the communication apparatus 400 in performing the method performed by the NFVO described in embodiments of this application. For example, the receiving unit 401 is configured to perform or support the communication apparatus 400 in performing operations 202, S11, S21, S31, 207 and 209 performed by the NFVO in the method shown in FIG. 2.

The processing unit 403 is configured to support the communication apparatus 400 in performing the method performed by the NFVO described in embodiments of this application. For example, the processing unit 403 is configured to perform or support the communication apparatus 400 in performing operations 201 and 210 performed by the NFVO in the method shown in FIG. 2.

The sending unit 402 is configured to perform or support the communication apparatus 400 in performing 203, S12, S22, S32, 208 and 211 performed by the NFVO in the method shown in FIG. 2.

It should be noted that, all related content of the operations in the foregoing method embodiments may correspond to function descriptions of corresponding functional modules. Details are not described herein again.

The management device provided in an embodiment of the application is configured to perform the method in any one of the foregoing embodiments, and therefore can achieve same effects as the method in the foregoing embodiments.

Figure 5:
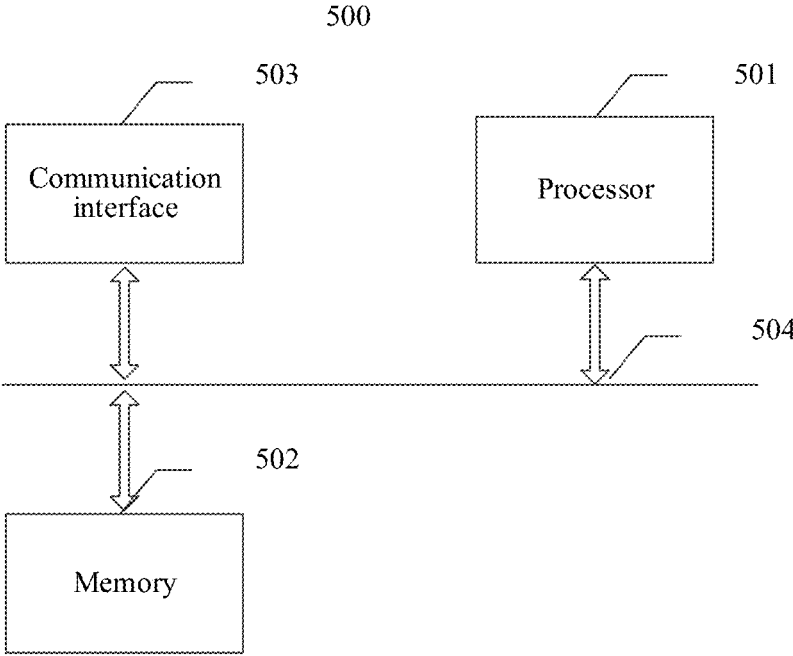
FIG. 5 is a schematic composition diagram of another management device according to an embodiment of the application.

FIG. 5 shows a management device 500 according to an embodiment of this application, configured to implement a function of the OSS/BSS in the foregoing methods. The management device 500 may be an OSS/BSS or a CN NSSMF, or may be an apparatus or a function in the OSS/BSS or the CN NSSMF. In addition, the management device 500 may be a chip system. In embodiments of this application, the chip system may include a chip, or may include a chip and another discrete component.

The management device 500 includes at least one processor 501, configured to implement a device of the OSS/BSS in the method provided in embodiments of this application or an apparatus or a function in the OSS/BSS. For example, the processor 501 may be configured to select information about an NSD from an NSD information list. For details, refer to detailed descriptions in the method example. Details are not described herein again.

The management device 500 may further include at least one memory 502, configured to store program instructions and/or data. The memory 502 is coupled to the processor 501. The coupling in embodiments of this application may be an indirect coupling or a communication connection between apparatus, units, or modules in an electrical form, a mechanical form, or another form, and is used for information exchange between the apparatus, the units, or the modules. The processor 501 may cooperate with the memory 502. The processor 501 may execute the program instructions stored in the memory 502. At least one of the at least one memory may be included in the processor.

The processor 501 and the memory 502 may also be a virtualized processor and a virtualized memory.

The management device 500 may further include a communication interface 503, configured to communicate with another device by using a transmission medium. In this way, an apparatus used in the management device 500 may communicate with another device. The processor 501 receives and sends data by using the communication interface 503, and is configured to implement the method performed by the OSS/BSS in the embodiment corresponding to FIG. 2.

In addition, the management device 500 may further include a network interface, configured to communicate with an external device. For example, the network interface is configured to communicate with user equipment and the like.

A connection medium between the communication interface 503, the processor 501, and the memory 502 is not limited in an embodiment of the application. In an embodiment of the application, in FIG. 5, the communication interface 503, the processor 501, and the memory 502 are connected through a bus 504. The bus is represented by using a bold line in FIG. 5. A connection manner between other components is merely an example for description, and is not limited thereto. The bus can be divided into an address bus, a data bus, a control bus, and the like. For ease of indication, the bus is represented by using only one bold line in FIG. 5. However, it does not indicate that there is only one bus or only one type of bus.

The communication apparatus provided in an embodiment of the application is configured to perform the method in any one of the foregoing embodiments, and therefore can achieve same effects as the method in the foregoing embodiments.

Figure 6:
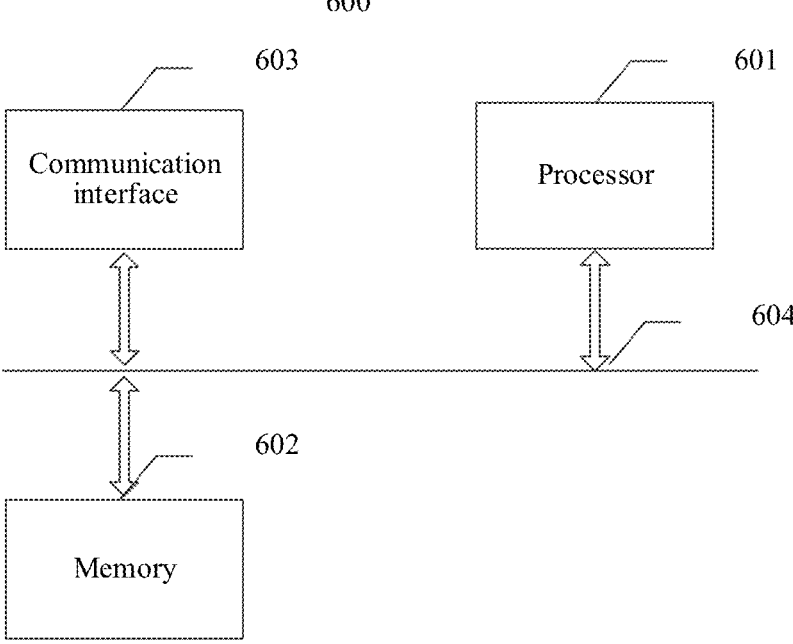
FIG. 6 is a schematic composition diagram of another communication apparatus according to an embodiment of the application.

FIG. 6 shows a communication apparatus 600 according to an embodiment of this application, configured to implement a function of the NFVO in the foregoing methods. The communication apparatus 600 may be an NFVO, or may be an apparatus or a function in the NFVO. In addition, the communication apparatus 600 may be a chip system. In embodiments of this application, the chip system may include a chip, or may include a chip and another discrete component.

The communication apparatus 600 includes at least one processor 601, configured to implement a function of the NFVO in the methods provided in embodiments of this application. For example, the processor 601 may be configured to create, based on an NS instantiation request, an NS instance related to an NSD, and the like. For details, refer to detailed descriptions in the method example. Details are not described herein again.

The communication apparatus 600 may further include at least one memory 602, configured to store program instructions and/or data. The memory 602 is coupled to the processor 601. The coupling in embodiments of this application may be an indirect coupling or a communication connection between apparatus, units, or modules in an electrical form, a mechanical form, or another form, and is used for information exchange between the apparatus, the units, or the modules. The processor 601 may cooperate with the memory 602. The processor 601 may execute the program instructions stored in the memory 602. At least one of the at least one memory may be included in the processor.

The processor 601 and the memory 602 may also be a virtualized processor and a virtualized memory.

The communication apparatus 600 may further include a communication interface 603, configured to communicate with another device by using a transmission medium. In this way, an apparatus used in the communication apparatus 600 may communicate with another device, for example, the management device 500. The processor 601 receives and sends data by using the communication interface 603, and is configured to implement the method performed by the NFVO in the embodiment corresponding to FIG. 2.

In addition, the communication apparatus 600 may further include a network interface, configured to communicate with an external device. For example, the network interface is configured to communicate with the management device 500 and the like.

A connection medium between the communication interface 603, the processor 601, and the memory 602 is not limited in an embodiment of the application. In an embodiment of the application, in FIG. 6, the communication interface 603, the processor 601, and the memory 602 are connected through a bus 604. The bus is represented by using a bold line in FIG. 6. A connection manner between other components is merely an example for description, and is not limited thereto. The bus can be divided into an address bus, a data bus, a control bus, and the like. For ease of indication, the bus is represented by using only one bold line in FIG. 6. However, it does not indicate that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in embodiments of this application. The general-purpose processor may be a microprocessor, any conventional processor, or the like. The operations of the method disclosed with reference to embodiments of this application may be directly performed by a hardware processor, or may be performed by using a combination of hardware in the processor and a software module.

In embodiments of this application, the memory may be a nonvolatile memory, for example, a hard disk drive (HDD) or a solid-state drive (solid-state drive, SSD), or may be a volatile memory such as a random-access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

The foregoing descriptions about implementations allow one of ordinary skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

All or some of the methods in embodiments of this application may be implemented by using software, hardware, firmware, or any combination thereof. When the software is used to implement the embodiments, all or a part of the embodiments may be implemented in a form of a computer program product. The computer program product includes one or more computer instructions. When the computer program instructions are loaded and executed on a computer, all or a part of the procedures or functions according to embodiments of the present disclosure are generated. The computer may be a general-purpose computer, a dedicated computer, a computer network, a network device, a terminal, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

What is claimed is:

1. A method for creating a network service (NS), comprising:

sending, by a management device, a network service descriptor (NSD) query request to a network functions virtualization orchestrator (NFVO), wherein the NSD query request is used to request information about an NSD from the NFVO;

receiving, by the management device, the information about the NSD sent by the NFVO, wherein the information about the NSD comprises information about a network service deployment flavour (NSDF) indicating a deployment flavour of a user for a network service, wherein the information about the NSDF comprises an identifier of the NSDF, an identifier of at least one virtualized network function descriptor (VNFD), and/or an identifier of at least one physical network function descriptor (PNFD), wherein the identifier of the at least one VNFD comprises an identifier of a first VNFD;

obtaining, by the management device, information about a first virtualized network function (VNF) instance based on the identifier of the first VNFD; and sending, by the management device, an NS instantiation request to the NFVO based on the information about the NSDF, to request the NFVO to create an NS instance related to the NSD, wherein the NS instantiation request comprises the identifier of the NSDF, the identifier of the first VNFD, and the information about the first VNF instance.

2. The method according to claim 1, wherein the receiving the information about the NSD sent by the NFVO comprises:

receiving, by the management device, an NSD information list sent by the NFVO, wherein the NSD information list comprises information about at least one NSD; and the method further comprises:

selecting, by the management device, the information about the NSD from the NSD information list.

3. The method according to claim 1, wherein the information about the NSD comprises information about at least one network service deployment flavour; and the method further comprises:

selecting, by the management device, the information about the NSDF from the information about the at least one network service deployment flavour.

4. The method according to claim 1, wherein the obtaining information about a first VNF instance based on the identifier of the first VNFD comprises:

sending, by the management device, a VNF query request to the NFVO, wherein the VNF query request carries the identifier of the first VNFD, and is used to request information about a VNF instance from the NFVO;

receiving, by the management device, an information list of the first VNF instance from the NFVO, wherein the information list of the first VNF instance comprises information about at least one VNF instance obtained by instantiating the first VNFD; and determining, by the management device, the information about the first VNF instance from the information list of the first VNF instance.

5. The method according to claim 1, wherein the identifier of the at least one VNFD comprises an identifier of a second VNFD; and the method further comprises:

obtaining, by the management device, information about a virtual private cloud VPC used to deploy a second VNF instance created based on the second VNFD, wherein the NS instantiation request further comprises the identifier of the second VNFD and the information about the VPC.

6. The method according to claim 5, wherein the obtaining information about a VPC comprises:

sending, by the management device, a VPC query request to the NFVO, wherein the VPC query request is used to request the information about the VPC from the NFVO;

receiving, by the management device, a VPC list from the NFVO, wherein the VPC list comprises information about at least one VPC; and determining, by the management device, the information about the VPC from the VPC list.

7. The method according to claim 1, further comprising:

obtaining, by the management device, information about a PNF based on the identifier of the at least one PNFD, wherein the NS instantiation request further comprises the identifier of the PNFD and the information about the PNF indicated by the identifier of the PNFD.

8. The method according to claim 7, wherein the obtaining information about the PNF based on the identifier of the at least one PNFD comprises:

sending, by the management device, a PNF query request to an equipment management system (EM), wherein the PNF query request carries the identifier of the PNFD used to request the information about the PNF associated with the PNFD from the NFVO;

receiving, by the management device, a PNF list from the EM, wherein the PNF list comprises information about at least one PNF associated with the PNFD; and determining, by the management device, the information about the PNF from the PNF list.

9. The method according to claim 1, wherein the management device is an operations support system (OSS) and/or a business support system (BSS) or a core network-network slice subnet management function (CN NSSMF).

10. A method for creating a network service (NS), comprising:

receiving, by a network functions virtualization orchestrator (NFVO), a network service descriptor (NSD) query request sent by a management device, wherein the NSD query request is used to request information about an NSD from the NFVO;

sending, by the NFVO, the information about the NSD to the management device, wherein the information about the NSD comprises information about a network service deployment flavour (NSDF) indicating a deployment flavour of a user for a network service, wherein the information about the NSDF comprises an identifier of the NSDF, an identifier of at least one virtualized network function descriptor (VNFD), and/or an identifier of at least one physical network function descriptor (PNFD), wherein the identifier of the at least one VNFD comprises an identifier of a first VNFD;

receiving, by the NFVO, an NS instantiation request sent by the management device based on the information about the NSDF, wherein the NS instantiation request comprises the identifier of the NSDF, the identifier of the first VNFD and information about a first virtualized network function (VNF) instance, wherein the information about the first VNF instance is obtained by the management device based on the identifier of the first VNFD; and creating, by the NFVO, an NS instance related to the NSD based on the NS instantiation request.

11. The method according to claim 10, wherein the sending the information about the NSD to the management device comprises:

sending, by the NFVO, an NSD information list to the management device comprising information about at least one NSD, to enable the management device to determine the information about the NSD from the NSD information list.

12. The method according to claim 10, wherein the information about the NSD comprises information about at least one network service deployment flavour, to enable the management device to determine the information about the NSDF from the information about the at least one network service deployment flavour.

13. The method according to claim 10, wherein the identifier of the at least one VNFD comprises an identifier of a first VNFD; and the method further comprises:

receiving, by the NFVO, a VNF query request sent by the management device, wherein the VNF query request carries the identifier of the first VNFD, and is used to request information about a VNF instance from the NFVO; and sending, by the NFVO, an information list of a first VNF instance to the management device, wherein the information list of the first VNF instance comprises information about at least one VNF instance obtained by instantiating the first VNFD, wherein the NS instantiation request comprises the identifier of the NSDF, the identifier of the first VNFD, and information about the first VNF instance.

14. The method according to claim 10, wherein the identifier of the at least one VNFD comprises an identifier of a second VNFD; and the method further comprises:

receiving, by the NFVO, a VPC query request sent by the management device, wherein the VPC query request is used to request information about a VPC from the NFVO; and sending, by the NFVO, a VPC list to the management device, wherein the VPC list comprises information about at least one VPC, to enable the management device to determine the information about the VPC from the VPC list, and the VPC is used to deploy a second VNF instance created based on the second VNFD, wherein the NS instantiation request further comprises the identifier of the second VNFD and the information about the VPC.

15. The method according to claim 10, wherein the NS instantiation request further comprises the identifier of the PNFD and/or information about a PNF indicated by the PNFD.

16. A management device, comprising:

a processor, a bus, a transceiver, and a memory coupled to the memory to store instructions, which when executed by the processor, cause the processor to perform operations, the operations comprising:

sending, by a management device, a network service descriptor (NSD) query request to a network functions virtualization orchestrator (NFVO), wherein the NSD query request is used to request information about an NSD from the NFVO;

receiving, by the management device, the information about the NSD sent by the NFVO, wherein the information about the NSD comprises information about a network service deployment flavour (NSDF) indicating a deployment flavour of a user for a network service, wherein the information about the NSDF comprises an identifier of the NSDF, an identifier of at least one virtualized network function descriptor (VNFD), and/or an identifier of at least one physical network function descriptor (PNFD), wherein the identifier of the at least one VNFD comprises an identifier of a first VNFD;

obtaining, by the management device, information about a first virtualized network function (VNF) instance based on the identifier of the first VNFD; and sending, by the management device, an NS instantiation request to the NFVO based on the information about the NSDF, to request the NFVO to create an NS instance related to the NSD, wherein the NS instantiation request comprises the identifier of the NSDF, the identifier of the first VNFD, and the information about the first VNF instance.

17. The device according to claim 16, wherein the receiving the information about the NSD sent by the NFVO comprises:

receiving, by the management device, an NSD information list sent by the NFVO, wherein the NSD information list comprises information about at least one NSD; and the method further comprises:

selecting, by the management device, the information about the NSD from the NSD information list.

18. The management device according to claim 16, wherein the obtaining information about a first VNF instance based on the identifier of the first VNFD comprises:

sending, by the management device, a VNF query request to the NFVO, wherein the VNF query request carries the identifier of the first VNFD, and is used to request information about a VNF instance from the NFVO;

receiving, by the management device, an information list of the first VNF instance from the NFVO, wherein the information list of the first VNF instance comprises information about at least one VNF instance obtained by instantiating the first VNFD; and determining, by the management device, the information about the first VNF instance from the information list of the first VNF instance.

19. The management device according to claim 16, wherein the identifier of the at least one VNFD comprises an identifier of a second VNFD; and the method further comprises:

obtaining, by the management device, information about a virtual private cloud VPC used to deploy a second VNF instance created based on the second VNFD, wherein the NS instantiation request further comprises the identifier of the second VNFD and the information about the VPC.

20. The management device according to claim 19, wherein the obtaining information about a VPC comprises:

sending, by the management device, a VPC query request to the NFVO, wherein the VPC query request is used to request the information about the VPC from the NFVO;

receiving, by the management device, a VPC list from the NFVO, wherein the VPC list comprises information about at least one VPC; and determining, by the management device, the information about the VPC from the VPC list.

21. The management device according to claim 16, further comprising:

obtaining, by the management device, information about a PNF based on the identifier of the at least one PNFD, wherein the NS instantiation request further comprises the identifier of the PNFD and the information about the PNF indicated by the identifier of the PNFD.

\* \* \* \* \*